US012646673B2

(12) United States Patent
Ansari

(10) Patent No.: US 12,646,673 B2
(45) Date of Patent: Jun. 2, 2026

(54) ELECTRICAL ASSEMBLY

(71) Applicant: Lear Corporation, Southfield, MI (US)

(72) Inventor: Ajmal Imran Ansari, Canton, MI (US)

(73) Assignee: Lear Corporation, Southfield, MI (US)

( * ) Notice: Subject to any disclaimer, the term of this patent is extended or adjusted under 35 U.S.C. 154(b) by 218 days.

(21) Appl. No.: 18/654,190

(22) Filed: May 3, 2024

(65) Prior Publication Data

US 2025/0343017 A1 Nov. 6, 2025

(51) Int. Cl.
*H01H 50/54* (2006.01)
*H01H 47/00* (2006.01)
*H01H 50/14* (2006.01)

(52) U.S. Cl.
CPC .......... *H01H 47/002* (2013.01); *H01H 50/14* (2013.01); *H01H 50/546* (2013.01); *H01H 2231/026* (2013.01)

(58) Field of Classification Search
CPC ...... H01H 50/546; H01H 15/005; H01H 1/20; H01H 2001/5811
USPC .................................................. 335/126, 131
See application file for complete search history.

(56) References Cited

U.S. PATENT DOCUMENTS

| | | | | | |
|---|---|---|---|---|---|
| 5,483,214 | A * | 1/1996 | Perreira | H01H 36/002 | 335/205 |
| 5,703,551 | A * | 12/1997 | Lefebvre | H01H 51/065 | 335/131 |
| 6,049,263 | A * | 4/2000 | Vilou | H01H 51/065 | 335/131 |
| 8,289,026 | B2 * | 10/2012 | Keil | H03K 17/97 | 324/415 |
| 9,159,512 | B2 * | 10/2015 | Kodama | H01H 47/002 | |
| 10,854,406 | B2 * | 12/2020 | Bobert | H01H 36/0006 | |
| 11,417,483 | B2 | 8/2022 | Hoffmann | | |
| 11,428,585 | B2 | 8/2022 | Hua | | |
| 2024/0371587 | A1 * | 11/2024 | Park | H01H 50/546 | |

FOREIGN PATENT DOCUMENTS

| | | | |
|---|---|---|---|
| CN | 215417932 | U | 1/2022 |
| KR | 20210040763 | A | 4/2021 |

* cited by examiner

*Primary Examiner* — Alexander Talpalatski
(74) *Attorney, Agent, or Firm* — McGarry Bair PC

(57) ABSTRACT

A contactor comprising a housing defining an interior; a first terminal disposed at least partially in the interior; a second terminal disposed at least partially in the interior; a shaft assembly disposed in the interior and movable between a first position and a second position to selectively electrically connect the first terminal with the second terminal, the shaft assembly including a movable circuit board; an electromagnet disposed in the interior to selectively move the shaft assembly; and a fixed circuit board disposed in the interior.

20 Claims, 19 Drawing Sheets

ELECTRICAL ASSEMBLY

TECHNICAL FIELD

The present disclosure generally relates to electrical assemblies, including electrical assemblies that can, for example, include contactors and be utilized in connection with vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
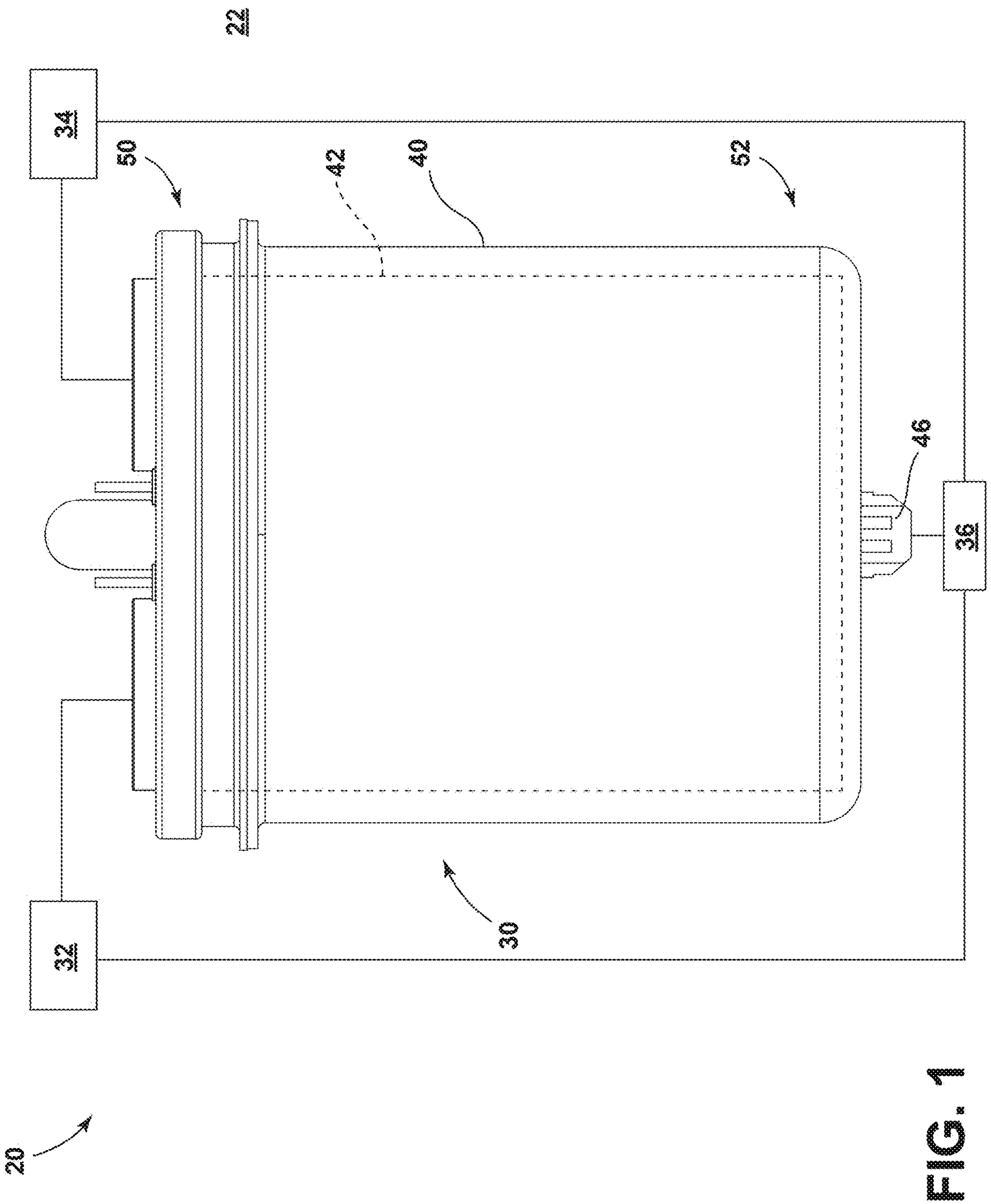
FIG. 1 is a schematic view generally illustrating an embodiment of an electrical assembly including a contactor according to teachings of the present disclosure.

Referring to FIG. 1, a schematic view illustrates an electrical assembly 20 including a contactor 30. The electrical assembly 20 is optionally connected between and selectively electrically connects a power source 32 and an electrical load 34. In a vehicle application, for example, a vehicle 22 includes the electrical assembly 20, the power source 32 includes a battery, and the electrical load 34 includes one or more vehicle systems, such as an electric driving/traction motor. The electrical assembly 20 is illustrated with an electronic controller 36. The electronic controller 36 is connected to and configured to control, at least in part, operation of at least one of the contactor 30, the power source 32, or the electrical load 34.

Figure 2:
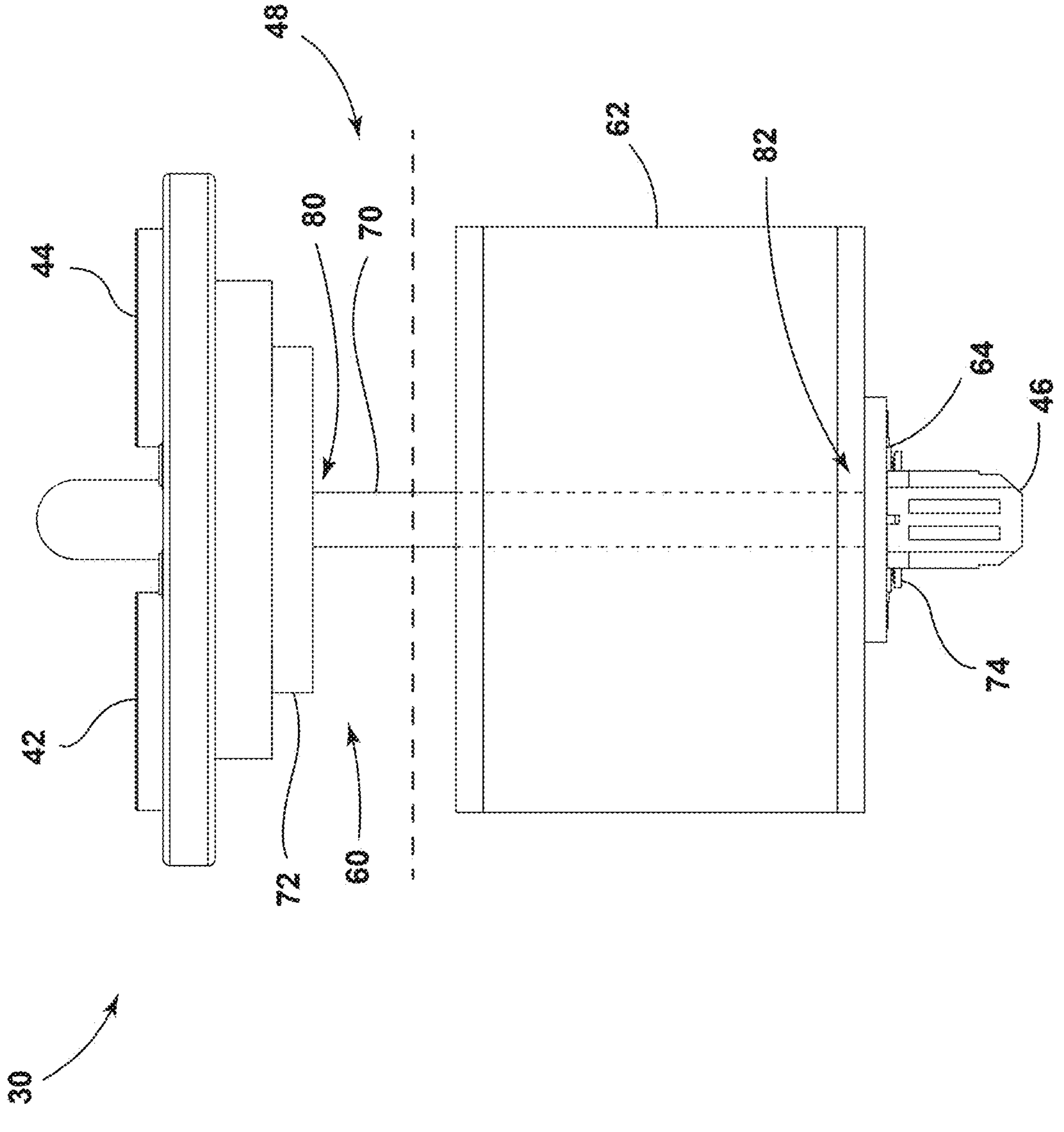
FIG. 2 is a side view generally illustrating an embodiment of a contactor, with a housing hidden, according to teachings of the present disclosure.

The contactor 30 includes a housing 40, a first terminal 42 (e.g., a first power terminal), a second terminal 44 (e.g., a second power terminal), and/or an electrical connector 46. The housing 40 defines an interior 48 and includes a first end 50 and a second end 52. The first and second terminals 42, 44 are disposed at the first end 50. A side view of the contactor 30 with the housing 40 hidden is illustrated in FIG. 2. The contactor 30 includes a shaft assembly 60, an electromagnet 62 (e.g., a solenoid), and/or a fixed circuit board 64 disposed in the interior 48. The fixed circuit board 64 is connected (e.g., fixed) to the electromagnet 62, such as to a bottom side of the electromagnet away from the first and second terminals 42, 44. The shaft assembly 60 includes a shaft 70, a shorting bar 72, and/or a movable circuit board 74. The shaft 70 extends into or through the electromagnet 62 such that activation of the electromagnet 62 moves the shaft 70 toward or away from the first terminal 42 and the second terminal 44. The shorting bar 72 is disposed at a first end 80 of the shaft 70 that is proximate the first terminal 42 and the second terminal 44. The movable circuit board 74 is connected to the shaft 70 and spaced from the shorting bar 72. In the example of FIG. 2, the movable circuit board 74 is disposed at a second end 82 of the shaft 70 opposite the first end 80 and is disposed below the fixed circuit board 64 and the electromagnet 62. The fixed circuit board 64 and the movable circuit board 74 are disposed between the electromagnet 62 and the second end 52 of the housing 40.

Figure 3:
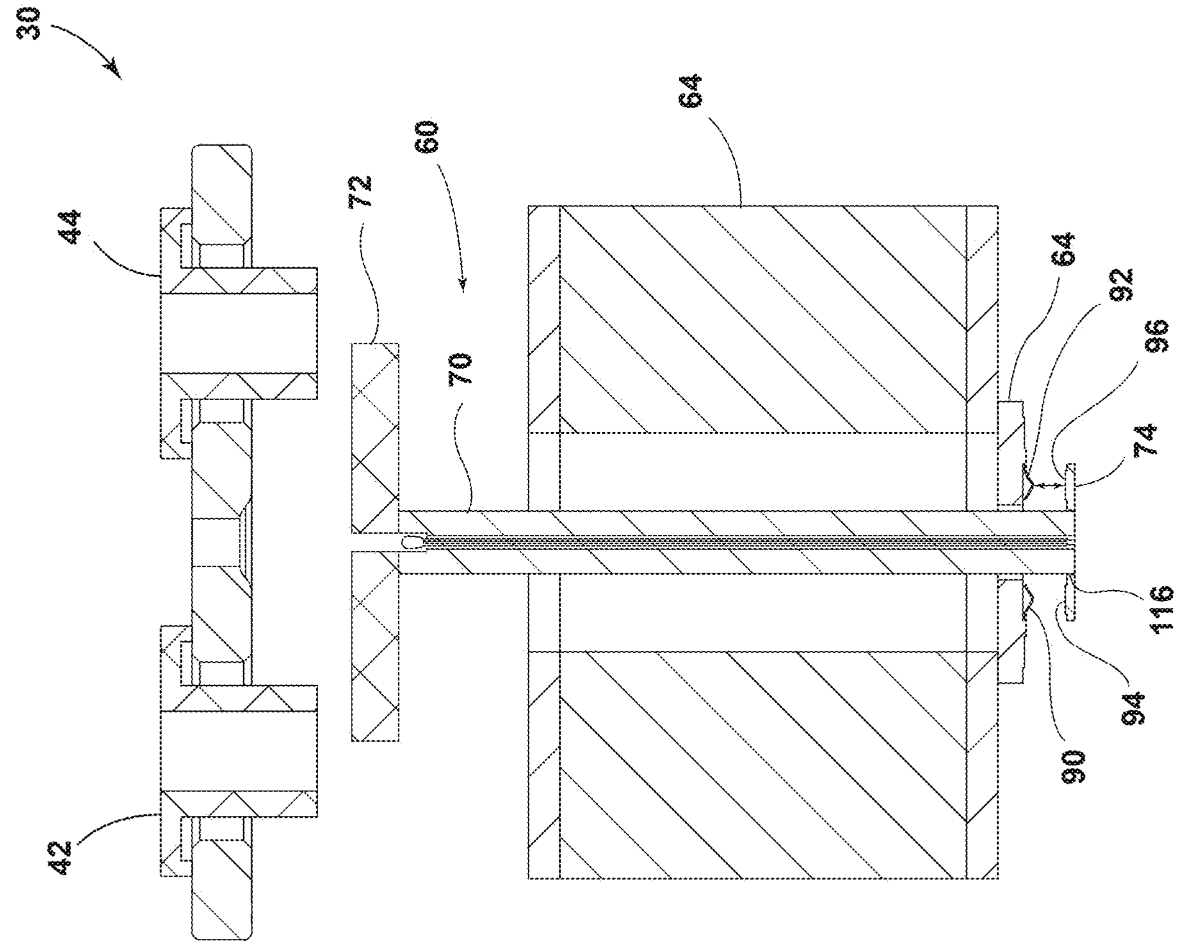
FIG. 3 is a cross-sectional view generally illustrating an embodiment of a contactor, with a housing hidden and a shaft assembly in a first position, according to teachings of the present disclosure.
Figure 4:
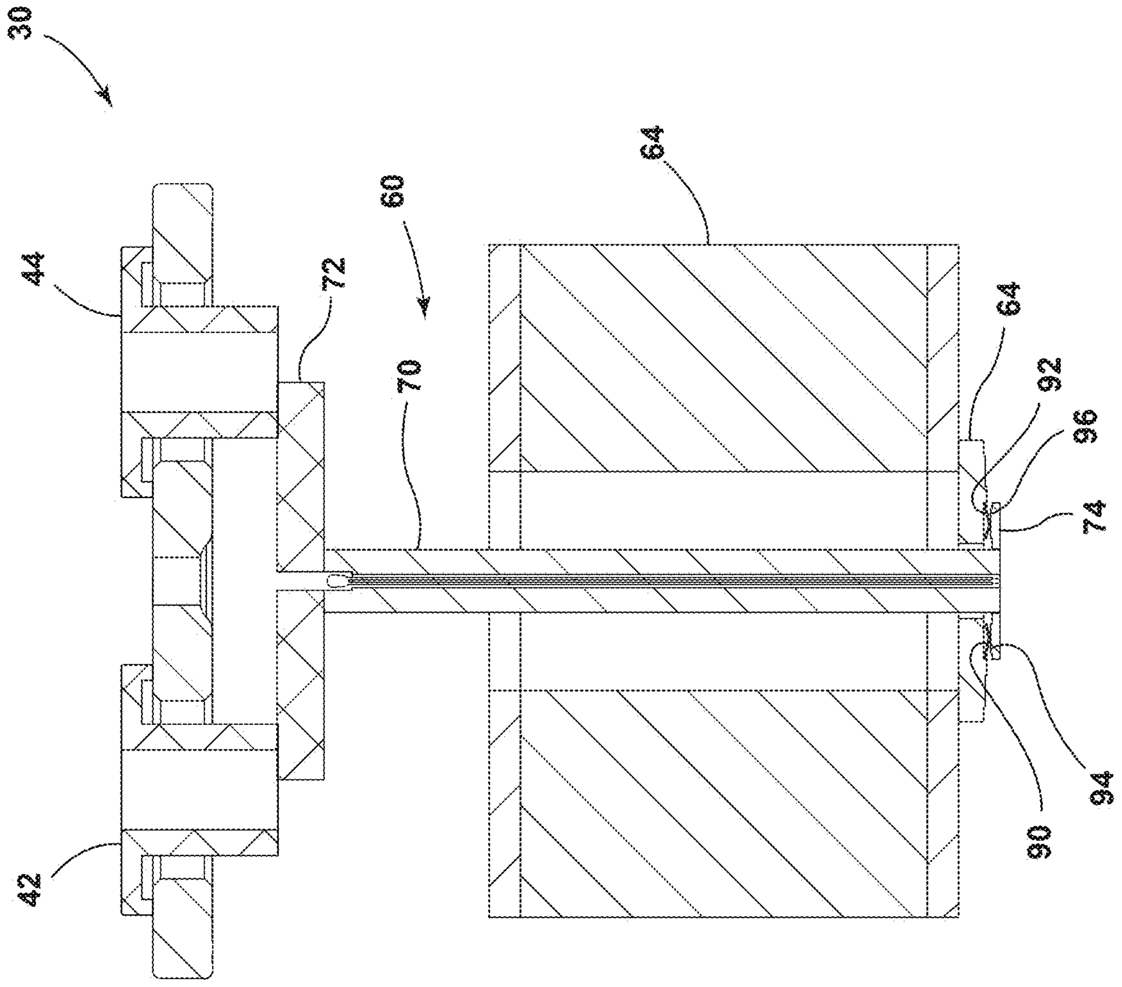
FIG. 4 is a cross-sectional view generally illustrating an embodiment of a contactor, with a housing hidden and a shaft assembly in a second position, according to teachings of the present disclosure.

The shaft assembly 60 includes a first position (e.g., a disconnected position), such as illustrated in FIG. 3, and a second position (e.g., a connected position), such as illustrated in FIGS. 2 and 4. In the first position, the shaft 70 is disposed such that the shorting bar 72 is spaced from and does not electrically connect the first terminal 42 and the second terminal 44. In the first position, the movable circuit board 74 is spaced from and/or not electrically connected to the fixed circuit board 64. In the second position, the shaft 70 is disposed such that the shorting bar 72 is in contact with and electrically connects the first terminal 42 and the second terminal 44. In the second position, the movable circuit board 74 is in contact with and/or electrically connected to the fixed circuit board 64. Referring to FIG. 3, the fixed circuit board 64 includes a first fixed circuit board contact 90 and a second fixed circuit board contact 92, and the movable circuit board 74 includes a first movable circuit board contact 94 and a second movable circuit board contact 96. In the first position of the shaft assembly 60, at least one of the first movable circuit board contact 94 or the second movable circuit board contact 96 is not in contact with and/or is electrically disconnected from the first fixed circuit board contact 90 and/or the second fixed circuit board contact 92. Referring to FIG. 4, in the second position of the shaft assembly 60, the first movable circuit board contact 94 is in contact with and electrically connected to the first fixed circuit board contact 90, and the second movable circuit board contact 96 is in contact with and electrically connected to the second fixed circuit board contact 92. At least one of the first fixed circuit board contact 90 or the first movable circuit board contact 94 can include a spring contact. At least one of the second fixed circuit board contact 92 or the second movable circuit board contact 96 can include a spring contact, such as a spring contact comprising beryllium and copper, for example. In the illustrated example, the first movable circuit board contact 94 and the second movable circuit board contact 96 are spring contacts, and the first fixed circuit board contact 90 and the second fixed circuit board contact 92 are contact pads.

Figure 5:
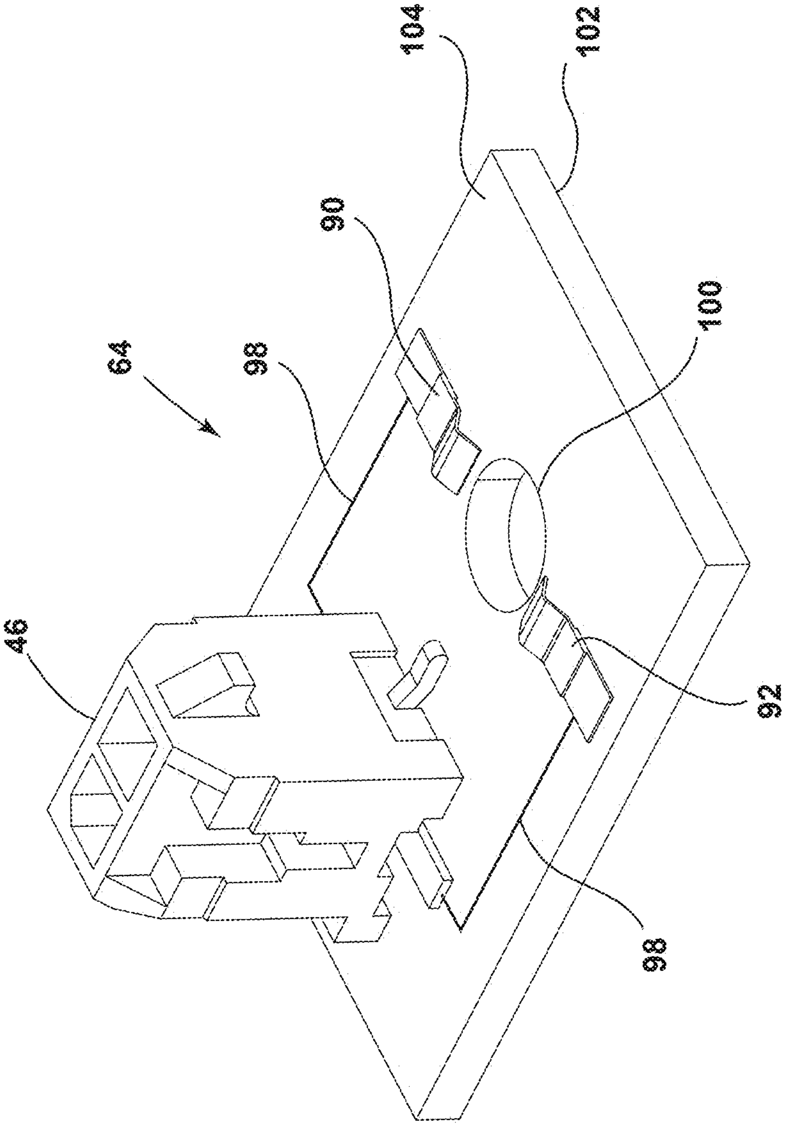
FIG. 5 is a perspective view generally illustrating an embodiment of a fixed circuit board according to teachings of the present disclosure.

Referring to FIG. 5, a perspective view of the fixed circuit board 64 is illustrated with the first fixed circuit board contact 90, the second fixed circuit board contact 92, and the electrical connector 46. The fixed circuit board 64 includes a first surface 102 that faces the first end 50 of the housing 40 (FIG. 1) and a second surface 104 opposite the first surface 102 that faces the second end 52 of the housing (FIG. 1). The first fixed circuit board contact 90, the second fixed circuit board contact 92, and the electrical connector 46 are disposed at the second surface 104. The first fixed circuit board contact 90 and the second fixed circuit board contact 92 are electrically connected to the electrical connector 46, such as via traces 98 of the fixed circuit board 64. The fixed circuit board 64 includes an aperture 100 through which the shaft 70 (FIG. 4) moves as the shaft assembly 60 (FIG. 4) moves to and between the first and second positions.

Figure 6:
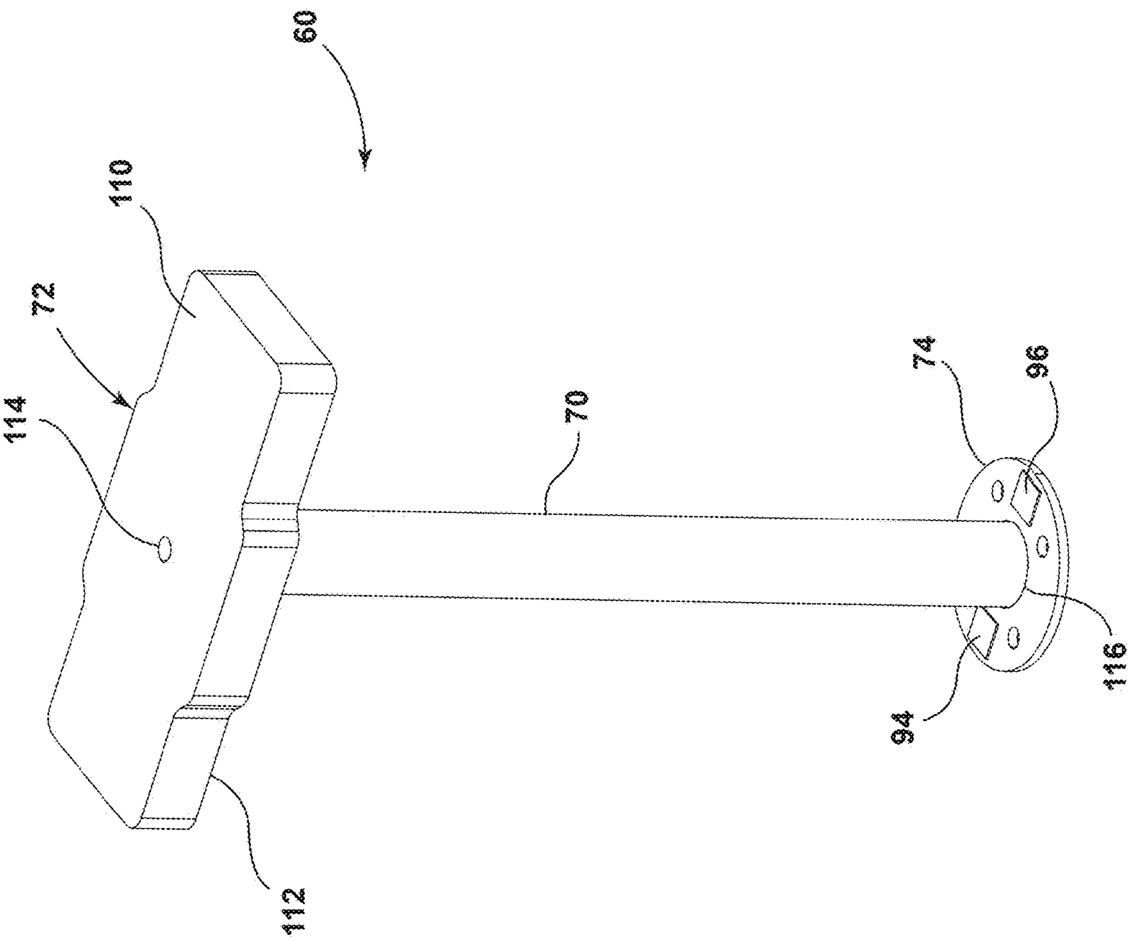
FIG. 6 is a perspective view generally illustrating an embodiment of a shaft assembly according to teachings of the present disclosure.

Referring to FIG. 6, a perspective view of the shaft assembly 60 is illustrated with the shaft 70, the shorting bar 72, and the movable circuit board 74. The movable circuit board 74 includes the first movable circuit board contact 94 and the second movable circuit board contact 96, which are illustrated as contact pads that contact the first fixed circuit board contact 90 and the second fixed circuit board contact 92 (e.g., spring contacts) in the second position of the shaft assembly 60 of FIG. 4. The shorting bar 72 includes a first surface 110, a second surface 112, and/or a shorting bar aperture 114 shown at the center of the shorting bar 72 and extending from the first surface 110 to the second surface 112. The shaft 70 extends into and/or through a movable circuit board aperture 116 of the movable circuit board 74.

Figure 7:
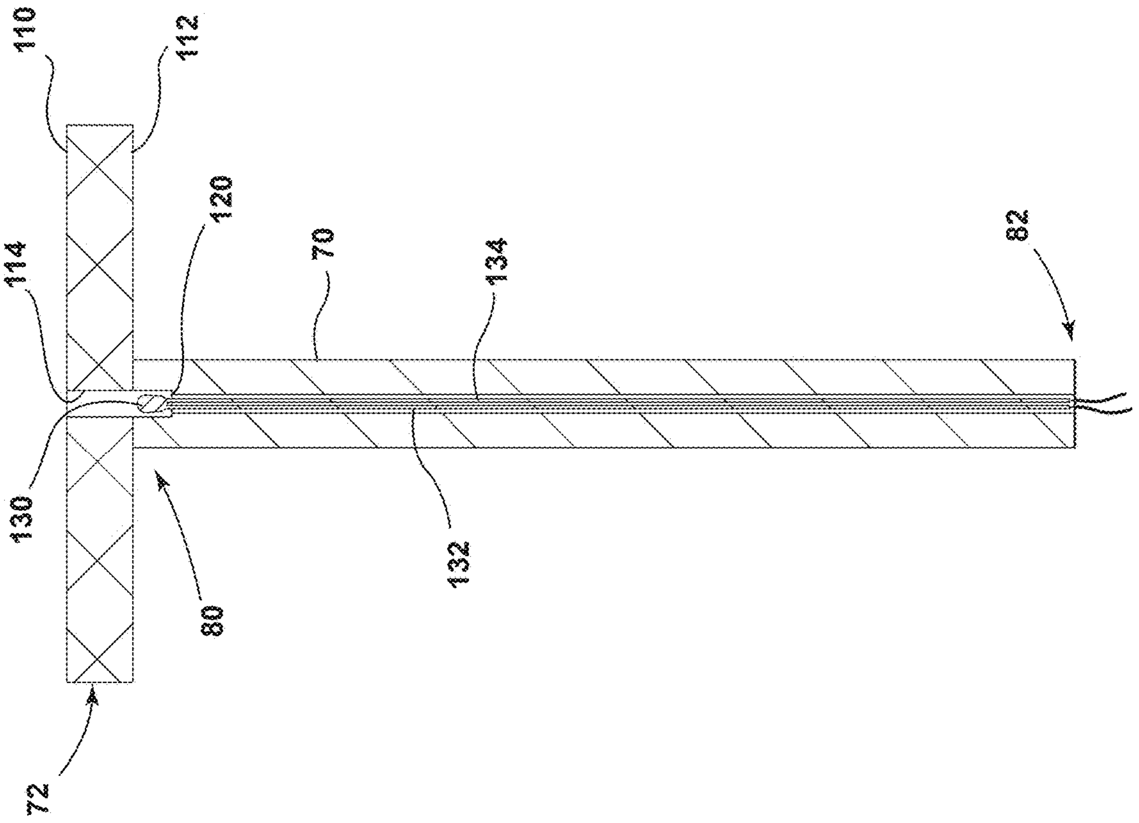
FIG. 7 is a cross-sectional view generally illustrating portions of an embodiment of a shaft assembly and a temperature sensor according to teachings of the present disclosure.

Referring to FIG. 7, the shaft 70 includes a shaft aperture 120 that extends through the shaft 70 (e.g., the shaft 70 can be hollow). The shaft aperture 120 is at least partially aligned with (e.g., coaxial with) the shorting bar aperture 114. A temperature sensor 130 is disposed at least partially in the shorting bar 72, such as in the shorting bar aperture 114, and/or at least partially in the shaft 70, such as in the shaft aperture 120 at the first end 80. A first conductor 132 and a second conductor 134 (e.g., first and second wires, leads, etc.) are connected to the temperature sensor 130 and extend through the shaft aperture 120 to or beyond the second end 82 of the shaft 70. Optionally, the temperature sensor 130 comprises a thermistor, such as a negative temperature coefficient (NTC) thermistor.

Figure 8:
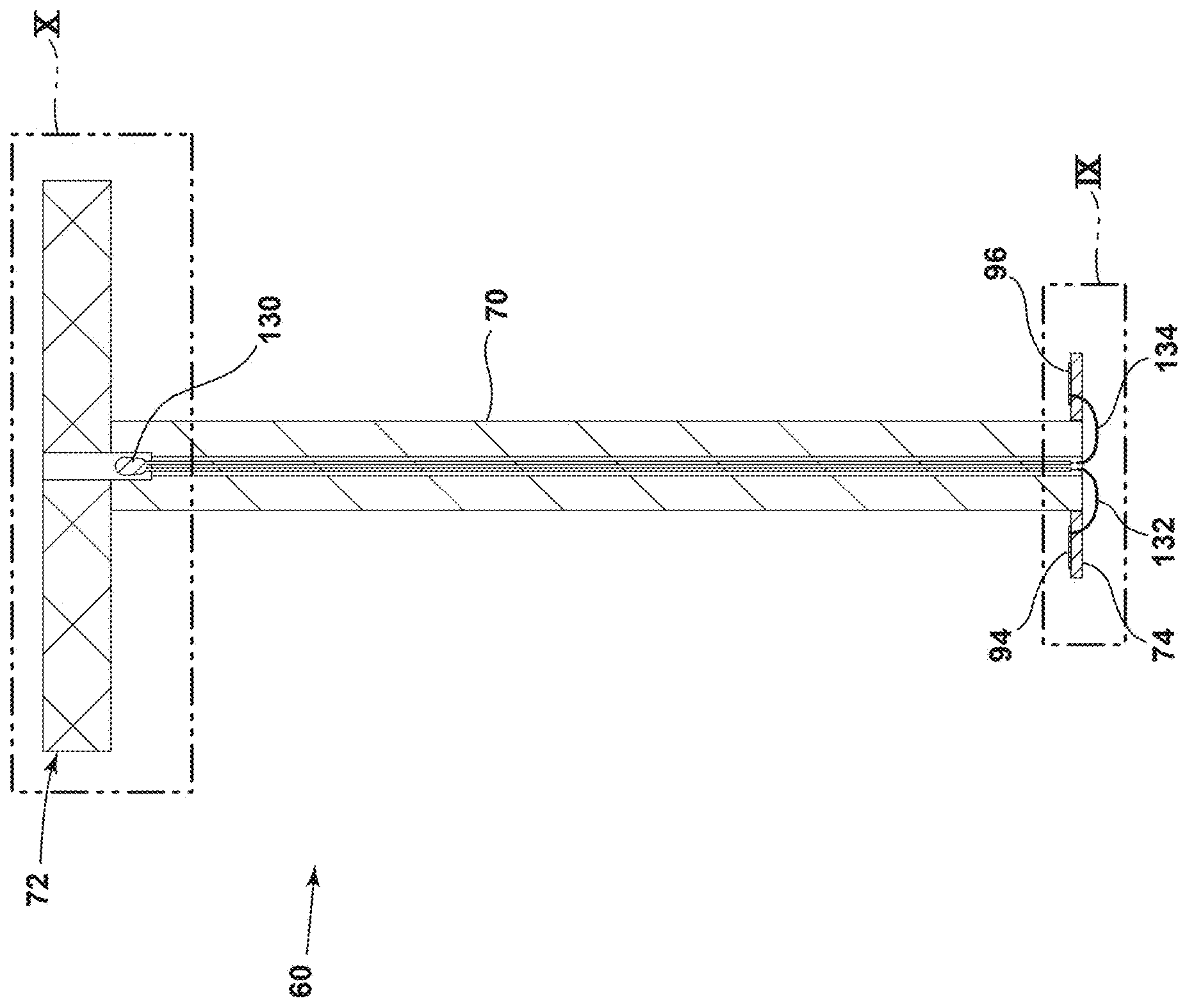
FIG. 8 is a cross-sectional view generally illustrating portions of an embodiment of a shaft assembly and a temperature sensor according to teachings of the present disclosure.
Figure 9:
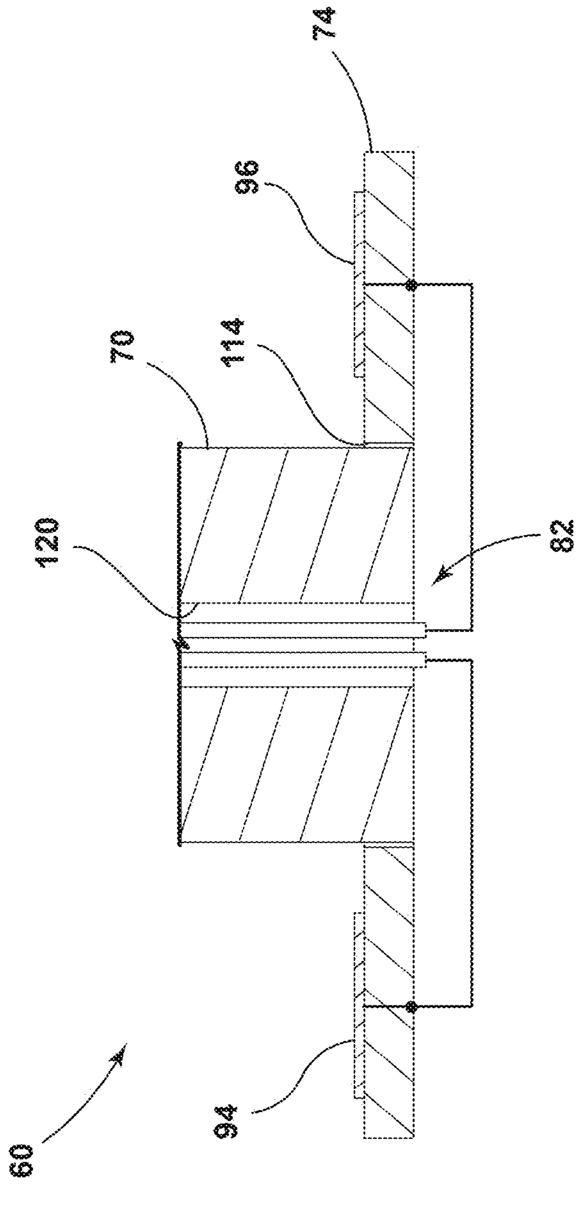
FIG. 9 is a cross-sectional view generally illustrating portions of an embodiment of a shaft assembly according to teachings of the present disclosure.

Referring to FIG. 8, the first conductor 132 is electrically connected to the first movable circuit board contact 94 of the movable circuit board 74, and the second conductor is electrically connected to the second movable circuit board contact 96 of the movable circuit board 74 such that the temperature sensor 130 is electrically connected to the movable circuit board 74. Referring to FIG. 9, the shaft 70 is disposed in the aperture 116 of the movable circuit board 74, and the first conductor 132 and the second conductor 134 extend from the second end 82 of the shaft 70. The first conductor 132 extends from the second end 82 and is directly or indirectly (e.g., via the movable circuit board 74) connected to the first movable circuit board contact 94. The second conductor 134 extends from the second end 82 and is directly or indirectly (e.g., via the movable circuit board 74) connected to the second movable circuit board contact 94.

Figure 10:
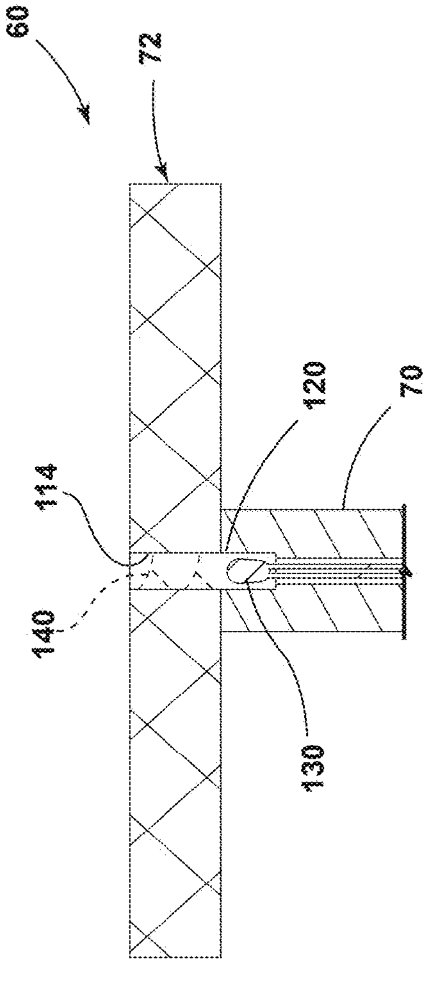
FIG. 10 is a cross-sectional view generally illustrating portions of an embodiment of a shaft assembly and a temperature sensor according to teachings of the present disclosure.
Figure 11:
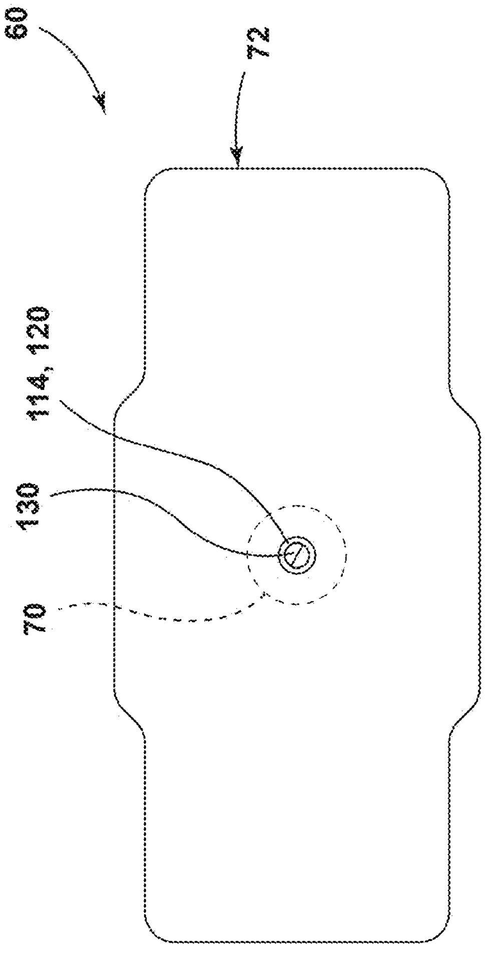
FIG. 11 is a top view generally illustrating portions of an embodiment of a shaft assembly and a temperature sensor according to teachings of the present disclosure.
Figure 12:
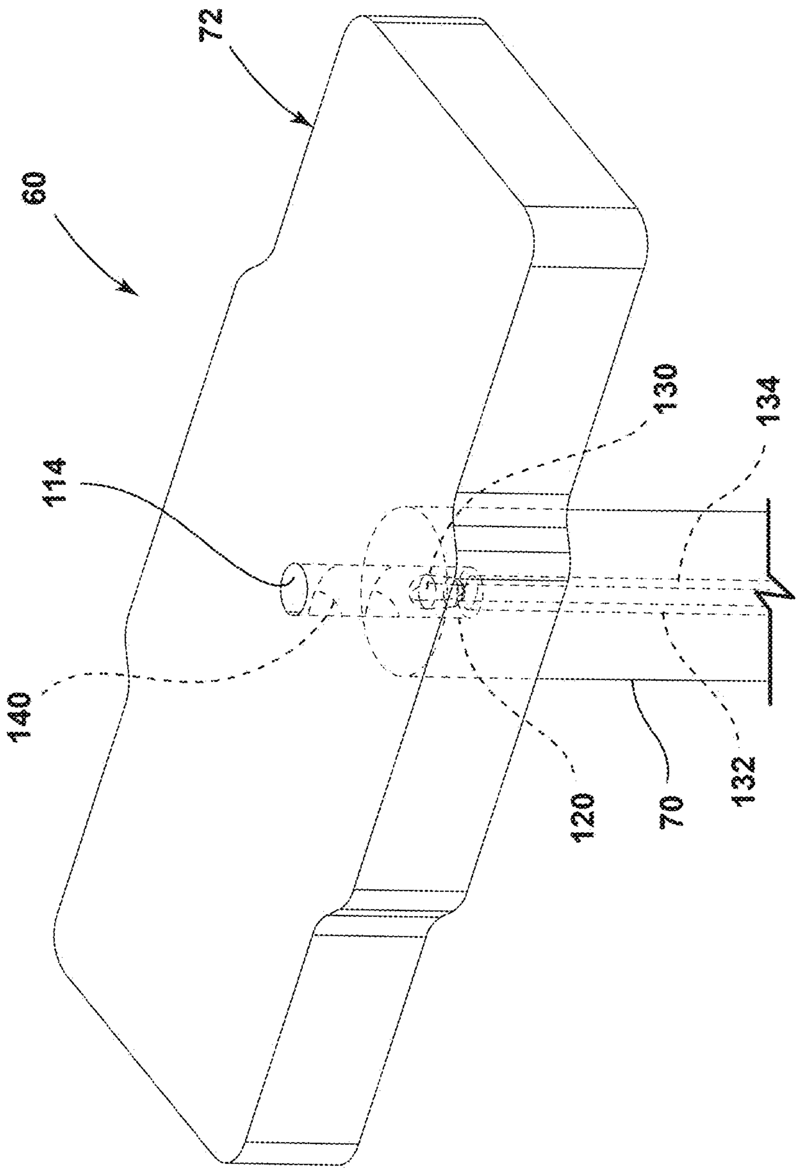
FIG. 12 is a perspective view generally illustrating portions of an embodiment of a shaft assembly and a temperature sensor according to teachings of the present disclosure.

Referring to FIG. 10-12, the temperature sensor 130 is disposed in at least one of the shorting bar aperture 114 of the shorting bar 72 or the shaft aperture 120 of the shaft 70 of the shaft assembly 60. In FIGS. 10 and 12, the temperature sensor 130 is disposed in the shaft aperture 120 below the shorting bar 72. Optionally, the temperature sensor 130 is disposed partially in the shaft aperture 120 and partially shorting bar aperture 114, or is disposed the shorting bar aperture 114. A potting material 140 disposed in at least one of the shorting bar aperture 114 or the shaft aperture 120, such as to seal the shorting bar aperture 114 and/or to secure the temperature sensor 130. For example, the potting material 140 can include an adhesive.

Figure 13:
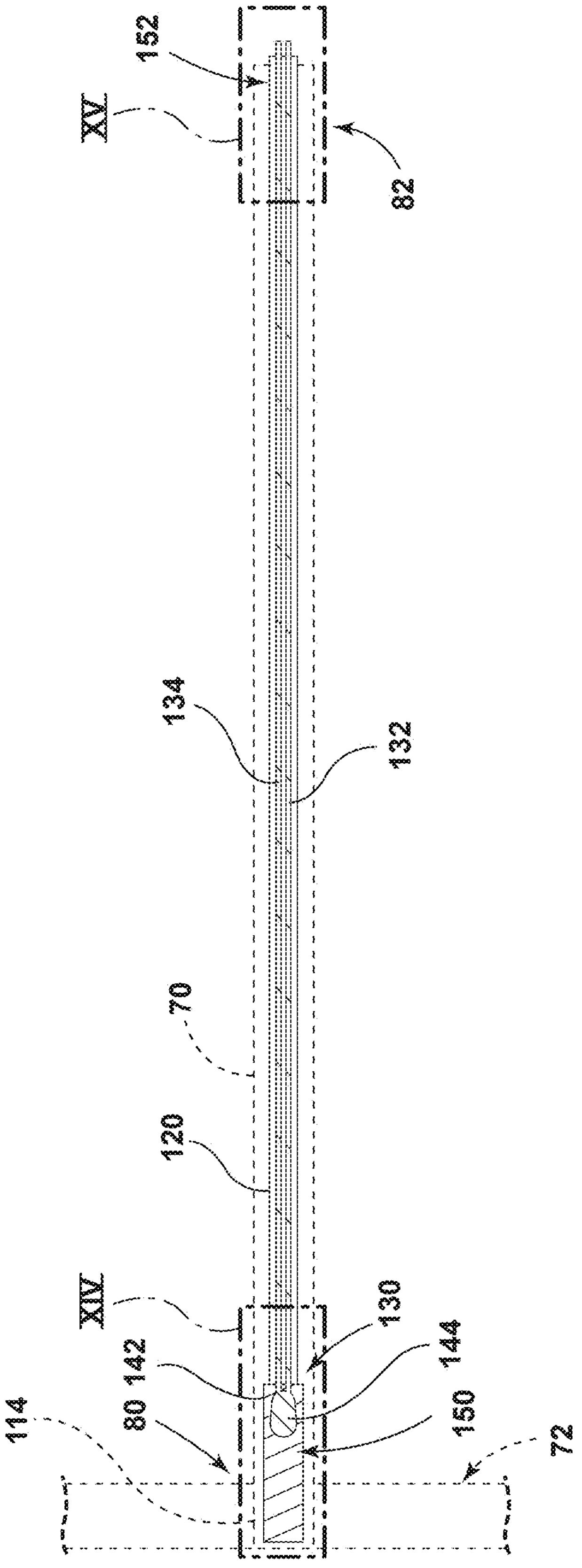
FIG. 13 is a cross-sectional view generally illustrating portions of an embodiment of a shaft assembly and a temperature sensor according to teachings of the present disclosure.
Figure 14:
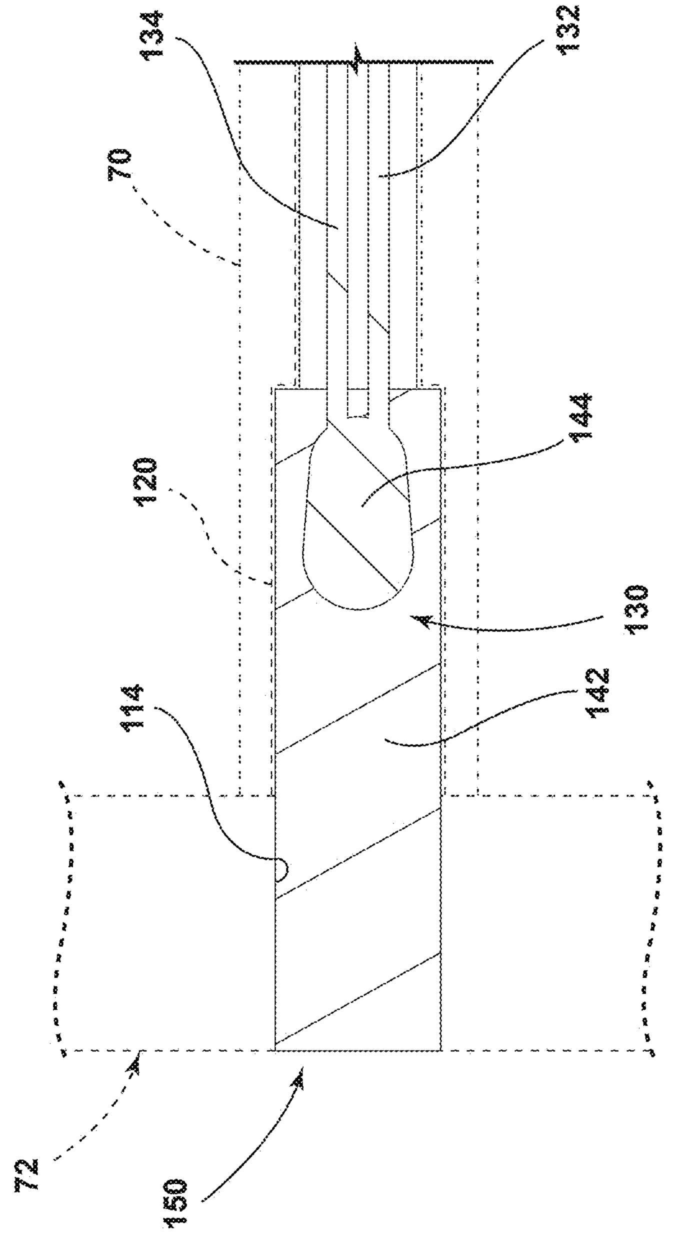
FIG. 14 is a cross-sectional view generally illustrating portions of an embodiment of a shaft assembly and a temperature sensor according to teachings of the present disclosure.
Figure 15:
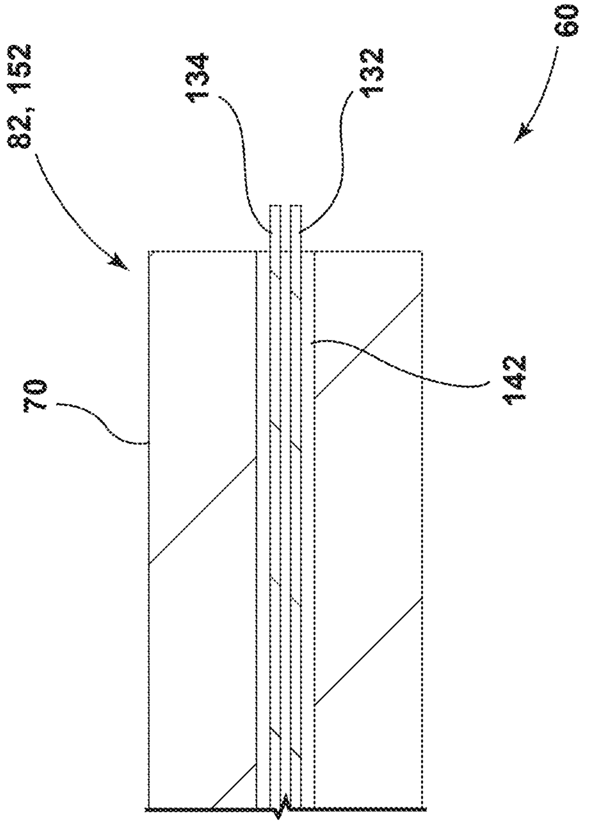
FIG. 15 is a cross-sectional view generally illustrating portions of an embodiment of a shaft assembly and a temperature sensor according to teachings of the present disclosure.

Referring to FIGS. 13-15, the temperature sensor 130 optionally includes a sensor housing 142. For example, the temperature sensor 130 can include a cartridge configuration. A first end 150 of the sensor housing 142 extends beyond a sensor element 144 and the first end 80 of the shaft 70 into the shorting bar aperture 114. Optionally, the sensor housing 142 fills the shorting bar aperture 114, such as instead of the potting material 140 of FIG. 10. The sensor housing 142 can be press fit and/or adhered in the shorting bar aperture 114. A second end 152 of the sensor housing 142 extends toward or to the second end 82 of the shaft 70. The first and second conductors 132, 134 extend through the second end 152 of the sensor housing 142, such as at the second end 82 of the shaft 70. Optionally, the sensor housing 142 is formed on and maintains the positions of the sensor element 144 and the first and second conductors 132, 134 and/or provides strain relief for the first and second conductors 132, 134.

Figure 16:
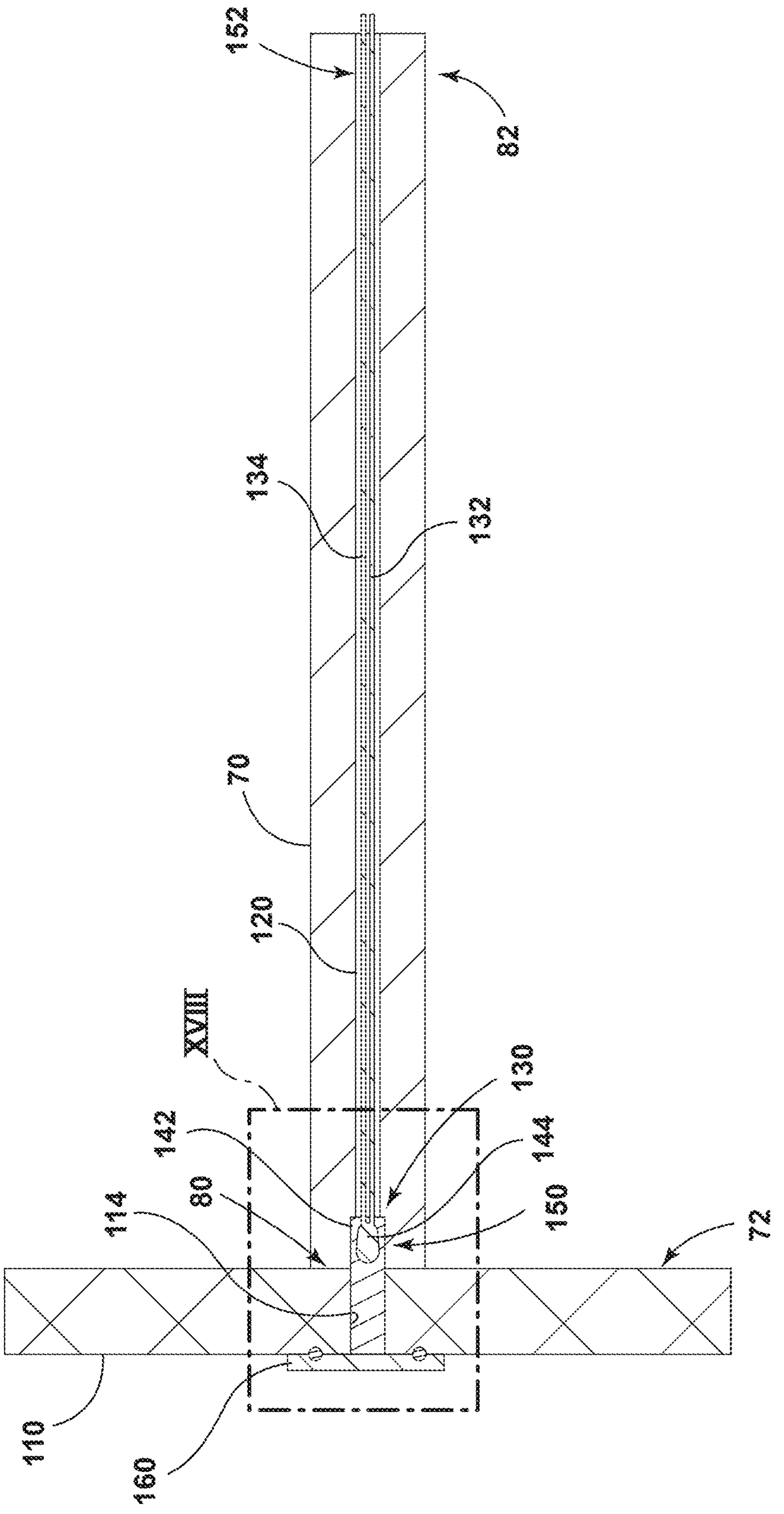
FIG. 16 is a cross-sectional view generally illustrating portions of an embodiment of a shaft assembly and a temperature sensor according to teachings of the present disclosure.
Figure 17:
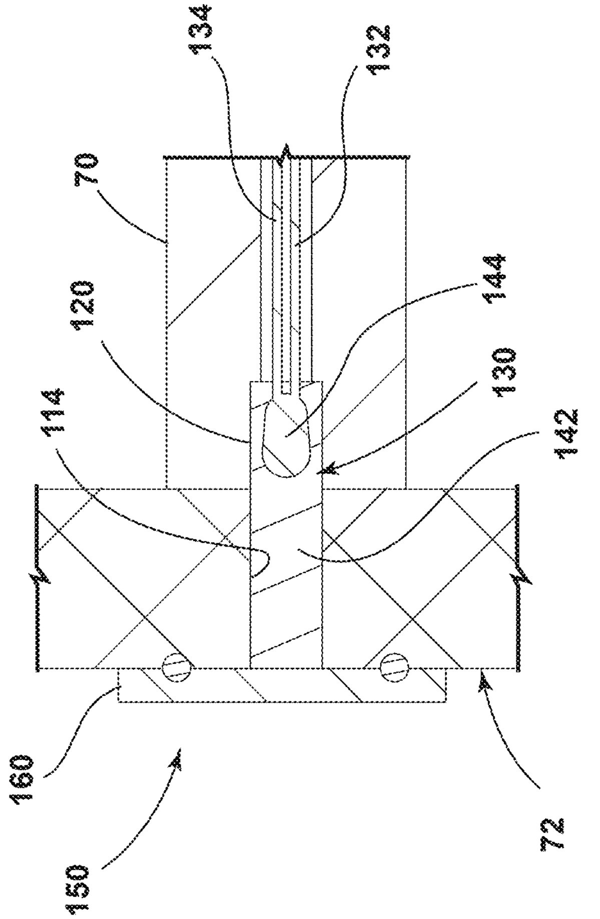
FIG. 17 is a cross-sectional view generally illustrating portions of an embodiment of a shaft assembly and a temperature sensor according to teachings of the present disclosure.

Referring to FIGS. 16 and 17, the sensor housing 142 optionally includes a flange 160 at the first end 150. The flange 160 is disposed at and fixed (e.g., laser welded) to the first surface 110 of the shorting bar 72. Fixing the flange 160 to the shorting bar 72 fixes the sensor housing 142 to the shorting bar 72 and the shaft 70. The flange 160 includes a larger outer dimension (e.g., diameter) than some or all other portions of the sensor housing 142.

Figure 18:
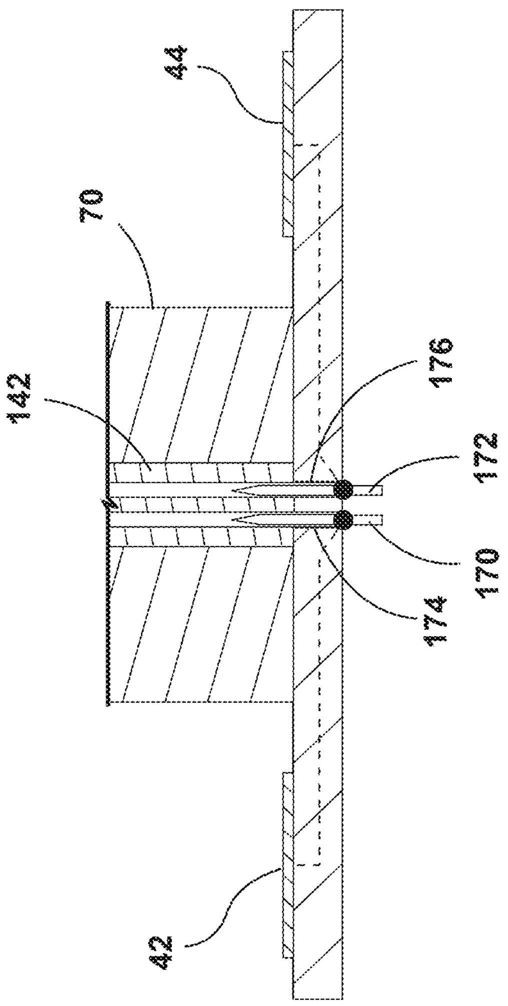
FIG. 18 is a cross-sectional view generally illustrating portions of an embodiment of a shaft assembly and a temperature sensor according to teachings of the present disclosure.

Referring to FIG. 18, examples including the sensor housing 142 can include pins 170, 172, the shaft 70 may not extend into the movable circuit board 74, and/or the movable circuit board 74 may include first and second pin apertures 174, 176, such as instead of the aperture 116 of FIG. 6. The pins 170, 172 are coupled to the first and second conductors 132, 134, respectively, such as at the second end 152 of the sensor housing 142 and/or the second end 82 of the shaft 70. The pins 170, 172 extend at least partially into the pin apertures 174, 176 of the movable circuit board 74 to electrically connect with the first and second movable circuit board contacts 94, 96, respectively. Optionally, the pins 170, 172 are soldered to the movable circuit board 74.

Figure 19:
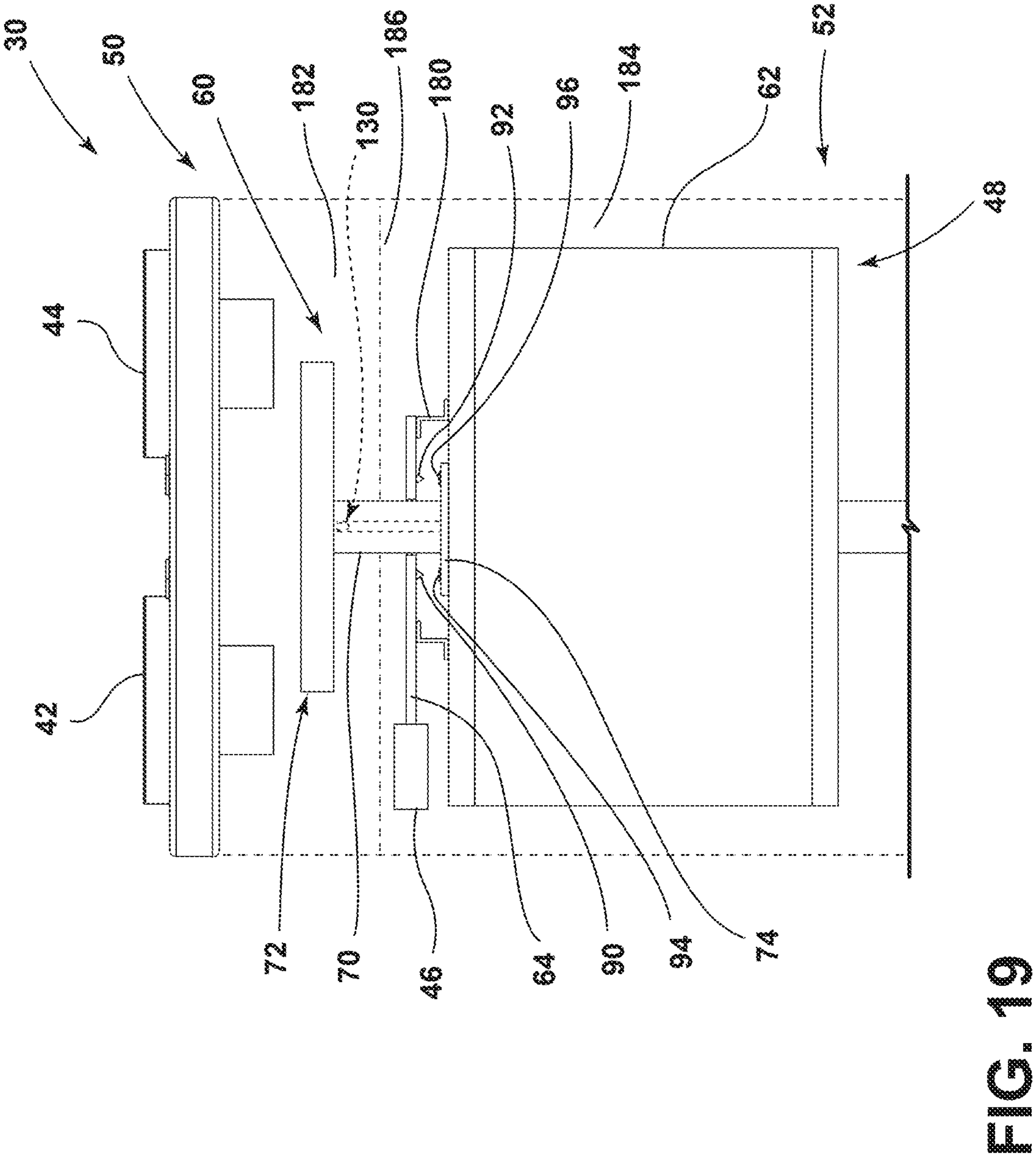
FIG. 19 is a side view generally illustrating an embodiment of a contactor, with a housing hidden and a shaft assembly in a first position, according to teachings of the present disclosure.
Figure 20:
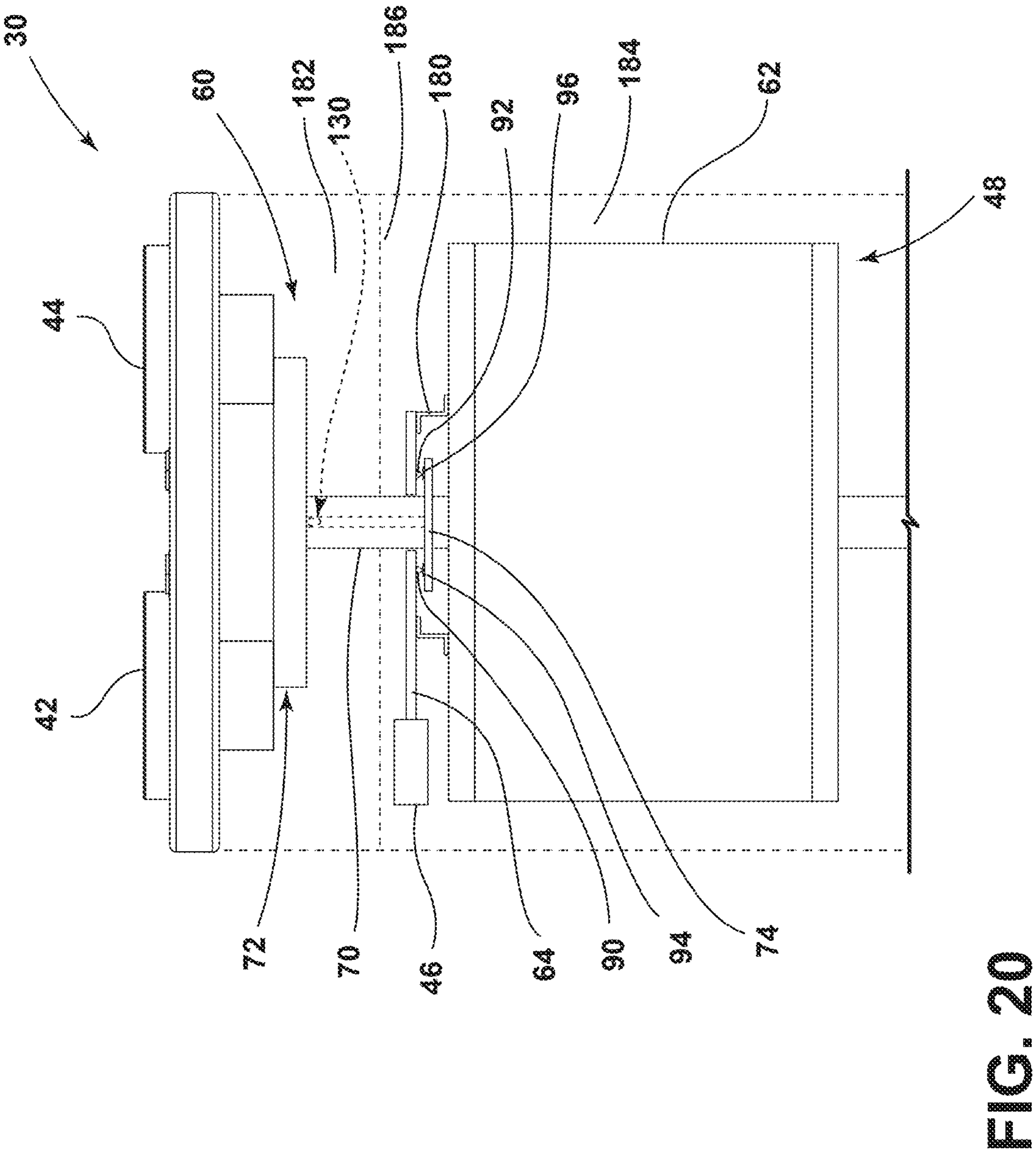
FIG. 20 is a side view generally illustrating an embodiment of a contactor, with a housing hidden and a shaft assembly in a second position, according to teachings of the present disclosure.

Referring to FIGS. 19 and 20, the fixed circuit board 64 and the movable circuit board 74 are, optionally, disposed in the interior 48 above (e.g., closer to the first and second terminals 42, 44 than) the electromagnet 62. The fixed circuit board 64 is connected to the top of the electromagnet 62 via a bracket 180 such that the fixed circuit board 64 is spaced from the electromagnet 62. The electrical connector 46 is connected the fixed circuit board 64 and extends toward a wall of the housing 40. The movable circuit board 74 is connected to the shaft 70 between the electromagnet 62 and the fixed circuit board 64 such that the fixed circuit board 64 and the movable circuit board 74 are disposed at least partially between the electromagnet 62 and the first end 50 of the housing 40. In the first position of the shaft assembly 60, the movable circuit board 74 is adjacent to or abutting the electromagnet 62 or a housing thereof, and the first and second movable circuit board contacts 94, 96 are spaced from the first and second fixed circuit board contacts 90, 92. With the shaft assembly 60 in the first position of FIG. 19, activation of the electromagnet 62 moves the shaft 70 upward toward the first and second terminals 42, 44 and the second position. As the shaft 70 moves upward, the movable circuit board 74 moves upward toward the fixed circuit board 64 and, in the second position of FIG. 20, the first movable circuit board contact 94 contacts the first fixed circuit board contact 90, and the second movable circuit board contact 96 contacts the second fixed circuit board contact 92 such that the temperature sensor 130 is electrically connected to the fixed circuit board 64 and the electrical connector 46. Optionally, the electrical connector 46 is electrically connected to the electromagnet 62. For example, the electrical connector 46 can be utilized to obtain temperature information from the temperature sensor 130 and/or to control operation of the electromagnet 62.

The interior 48 can include an arc chamber 182 the extends from a top of the housing 40 beyond inner ends of the first and second terminals 42, 44 and beyond the shorting bar 72 in the first position. For example, the shorting bar 72 is disposed in the arc chamber 182 in the first position and the second position. The arc chamber 182 can, for example, be filled with an inert gas to limit or prevent fire in the housing 40 associated with arcing between the first and second terminals 42, 44 and the shorting bar 72. The interior 48 can include a coil chamber 184 adjacent to and fluidly sealed from the arc chamber 182. The coil chamber 184 can be fluidly sealed from the arc chamber 182 by a seal 186. The electromagnet 62, the fixed circuit board 64, portions of the shaft 70, the movable circuit board 74, and the bracket 180 are disposed in the coil chamber 184.

Determining and/or monitoring the temperature of contactors, such as the contactor 30, can be desirable to detect faults and avoid failures. For example, temperatures above a threshold temperature can indicate a fault, such as an overcurrent fault. The highest temperatures of contactor 30 can be in the first and second terminals 42, 44 and/or the shorting bar 72, so determining and/or monitoring the temperature of one or more of those components can be desirable. Disposing the temperature sensor 130 proximate the shorting bar 72 (e.g., at the first end 80 of the shaft 70) and/or at least partially in the shorting bar 72 can provide more accurate temperature information for the shorting bar 72 and/or the first and second terminals 42, 44 than other designs, such as design that do not include temperatures sensors proximate a shorting bar.

The instant disclosure includes the following non-limiting embodiments:

A contactor, comprising a housing defining an interior; a first terminal disposed at least partially in the interior; a second terminal disposed at least partially in the interior; a shaft assembly disposed in the interior and movable between a first position and a second position to selectively electrically connect the first terminal with the second terminal, the shaft assembly including a movable circuit board; an electromagnet disposed in the interior to selectively move the shaft assembly; and a fixed circuit board disposed in the interior.

The contactor of any preceding embodiment, wherein the shaft assembly includes: a shaft; a shorting bar coupled to the shaft, the shorting bar spaced from the first terminal and the second terminal in the first position of the shaft assembly and in contact with the first terminal and the second terminal in the second position of the shaft assembly; and a temperature sensor disposed in the shaft and/or the shorting bar.

The contactor of any preceding embodiment, wherein the shaft assembly includes a conductor connected to the temperature sensor and the movable circuit board, the conductor extending at least partially through the shaft.

The contactor of any preceding embodiment, wherein the shaft assembly includes a pin connected to an end of the conductor, the pin extending at least partially through and soldered to the movable circuit board.

The contactor of any preceding embodiment, wherein the temperature sensor comprises a thermistor.

The contactor of any preceding embodiment, wherein the temperature sensor includes a sensor housing.

The contactor of any preceding embodiment, wherein the shorting bar includes an aperture extending from a first surface of the shorting bar to a second surface of the shorting bar; and the sensor housing is disposed at least partially in the aperture.

The contactor of any preceding embodiment, wherein the first surface faces the first terminal and the second terminal; a flange of the sensor housing is in contact with the first surface; and the sensor housing extends through the aperture beyond the second surface into the shaft.

The contactor of any preceding embodiment, wherein the movable circuit board includes a first movable circuit board contact; the fixed circuit board includes a first fixed circuit board contact; the first movable circuit board contact is spaced from the first fixed circuit board contact in the first position of the shaft assembly; and the first movable circuit board contact is in contact with the first fixed circuit board contact in the second position of the shaft assembly.

The contactor of any preceding embodiment, wherein at least one of the first movable circuit board contact or the first fixed circuit board contact comprises a spring contact.

The contactor of any preceding embodiment, wherein the first fixed circuit board contact comprises a spring contact and the first movable circuit board contact comprises a contact pad.

The contactor of any preceding embodiment, wherein the fixed circuit board includes an electrical connector that extends through a housing wall of the housing.

The contactor of any preceding embodiment, wherein the housing includes a first end and a second end opposite the first end; and the first terminal and the second terminal are disposed at the first end.

The contactor of any preceding embodiment, wherein the fixed circuit board includes a first surface facing the first end of the housing and a second surface facing the second end of the housing; and the first fixed circuit board contact is disposed at the second surface.

The contactor of any preceding embodiment, wherein the fixed circuit board is disposed at least partially between the electromagnet and the second end of the housing.

The contactor of any preceding embodiment, wherein the fixed circuit board is disposed at least partially between the electromagnet and the first end of the housing.

The contactor of any preceding embodiment, wherein the interior includes an arc chamber; a shorting bar of the shaft assembly is disposed in the arc chamber; and the fixed circuit board is disposed at least partially between the arc chamber and the electromagnet.

The contactor of any preceding embodiment, wherein the fixed circuit board is mounted to the electromagnet via a bracket such that the fixed circuit board is spaced from the electromagnet.

The contactor of any preceding embodiment, wherein the fixed circuit board and the movable circuit board are disposed below the electromagnet.

An electrical assembly including the contactor of any preceding embodiment and a battery connected to the contactor.

A vehicle, comprising a battery; and a battery disconnect unit electrically connected to the battery and including the contactor of any preceding embodiment.

An electronic controller configured to control operation of the electrical assembly and/or the contactor of any preceding embodiment.

A non-transitory computer-readable storage medium having a computer program encoded thereon for controlling the electrical assembly and/or contactor of any preceding embodiment.

In examples, a controller (e.g., the electronic controller 36) may include an electronic controller and/or include an electronic processor, such as a programmable microprocessor and/or microcontroller. In embodiments, a controller may include, for example, an application specific integrated circuit (ASIC) and/or an embedded controller. A controller may include a central processing unit (CPU), a memory (e.g., a non-transitory computer-readable storage medium), and/or an input/output (I/O) interface. A controller may be configured to perform various functions, including those described in greater detail herein, with appropriate programming instructions and/or code embodied in software, hardware, and/or other medium. In embodiments, a controller may include a plurality of controllers. In embodiments, a controller may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof. The word "exemplary" is used herein to mean "serving as a non-limiting example."

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above. The term "at least one of" in the context of, e.g., "at least one of A, B, and C" or "at least one of A, B, or C" includes only A, only B, only C, or any combination or subset of A, B, and C, including any combination or subset of one or a plurality of A, one or a plurality of B, and one or a plurality of C.

Although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. The term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

A controller, an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

An article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A contactor, comprising:
a housing defining an interior;
a first terminal disposed at least partially in the interior;
a second terminal disposed at least partially in the interior;
a shaft assembly disposed in the interior and movable between a first position and a second position to selectively electrically connect the first terminal with the second terminal, the shaft assembly including a movable circuit board;
an electromagnet disposed in the interior to selectively move the shaft assembly; and
a fixed circuit board disposed in the interior.

2. The contactor of claim 1, wherein the shaft assembly includes:
a shaft;
a shorting bar coupled to the shaft, the shorting bar spaced from the first terminal and the second terminal in the first position of the shaft assembly and in contact with the first terminal and the second terminal in the second position of the shaft assembly; and
a temperature sensor disposed in the shaft and/or the shorting bar.

3. The contactor of claim 2, wherein the shaft assembly includes a conductor connected to the temperature sensor and the movable circuit board, the conductor extending at least partially through the shaft.

4. The contactor of claim 3, wherein the shaft assembly includes a pin connected to an end of the conductor, the pin extending at least partially through and soldered to the movable circuit board.

5. The contactor of claim 3, wherein the temperature sensor comprises a thermistor.

6. The contactor of claim 2, wherein the temperature sensor includes a sensor housing.

7. The contactor of claim 6, wherein the shorting bar includes an aperture extending from a first surface of the shorting bar to a second surface of the shorting bar; and the sensor housing is disposed at least partially in the aperture.

8. The contactor of claim 7, wherein the first surface faces the first terminal and the second terminal;

a flange of the sensor housing is in contact with the first surface; and the sensor housing extends through the aperture beyond the second surface into the shaft.

9. The contactor of claim 1, wherein the movable circuit board includes a first movable circuit board contact;

the fixed circuit board includes a first fixed circuit board contact;

the first movable circuit board contact is spaced from the first fixed circuit board contact in the first position of the shaft assembly; and the first movable circuit board contact is in contact with the first fixed circuit board contact in the second position of the shaft assembly.

10. The contactor of claim 9, wherein at least one of the first movable circuit board contact or the first fixed circuit board contact comprises a spring contact.

11. The contactor of claim 9, wherein the first fixed circuit board contact comprises a spring contact and the first movable circuit board contact comprises a contact pad.

12. The contactor of claim 9, wherein the fixed circuit board includes an electrical connector that extends through a housing wall of the housing.

13. The contactor of claim 9, wherein the housing includes a first end and a second end opposite the first end; and the first terminal and the second terminal are disposed at the first end.

14. The contactor of claim 13, wherein the fixed circuit board includes a first surface facing the first end of the housing and a second surface facing the second end of the housing; and the first fixed circuit board contact is disposed at the second surface.

15. The contactor of claim 13, wherein the fixed circuit board is disposed at least partially between the electromagnet and the second end of the housing.

16. The contactor of claim 13, wherein the fixed circuit board is disposed at least partially between the electromagnet and the first end of the housing.

17. The contactor of claim 16, wherein the interior includes an arc chamber;

a shorting bar of the shaft assembly is disposed in the arc chamber; and the fixed circuit board is disposed at least partially between the arc chamber and the electromagnet.

18. The contactor of claim 16, wherein the fixed circuit board is mounted to the electromagnet via a bracket such that the fixed circuit board is spaced from the electromagnet.

19. The contactor of claim 1, wherein the fixed circuit board and the movable circuit board are disposed below the electromagnet.

20. A vehicle, comprising:

a battery; and a battery disconnect unit electrically connected to the battery and including the contactor of claim 1.

* * * * *